United States Patent [19]

Huber

[11] Patent Number: 5,525,002

[45] Date of Patent: Jun. 11, 1996

[54] CONNECTING FITTING

[75] Inventor: Edgar Huber, Hard, Austria

[73] Assignee: Julius Blum Gesellschaft m.b.H., Höchst, Austria

[21] Appl. No.: 265,934

[22] Filed: Jun. 27, 1994

[30] Foreign Application Priority Data

Jul. 2, 1993 [AT] Austria .................. 1305/93

[51] Int. Cl.⁶ .................................. B25G 3/00
[52] U.S. Cl. .................. 403/261; 403/231; 403/405.1; 312/348.2
[58] Field of Search ................... 403/261, 231, 403/230, 233, 245, 407.1, 406.1, 405.1, 24, 289, 256, 286, 401, 402; 312/348.2, 140, 111

[56] References Cited

U.S. PATENT DOCUMENTS

| 4,042,288 | 8/1977 | Litchfield ............... 312/348.2 |
| 4,099,815 | 7/1978 | Cox et al. ............... 312/348.2 |
| 4,193,709 | 3/1980 | Crook ..................... 403/233 X |
| 4,219,247 | 8/1980 | Litchfield et al. . |
| 4,279,455 | 7/1981 | Santo ..................... 312/348.2 |
| 4,627,760 | 12/1986 | Yagi et al. . |
| 4,984,929 | 1/1991 | Röck et al. ............... 403/230 |
| 5,076,723 | 12/1991 | Berger .................... 403/245 X |
| 5,207,526 | 5/1993 | Brustle et al. ............ 403/245 X |

FOREIGN PATENT DOCUMENTS

| 2410051 | 9/1975 | Germany .................. 403/405.1 |
| 8531302 U | 8/1986 | Germany . |
| 588404 | 1/1978 | U.S.S.R. .................. 403/406.1 |
| 2190284 | 11/1987 | United Kingdom ........... 312/348.2 |
| 2147387 | 5/1988 | United Kingdom ........... 403/402 |

*Primary Examiner*—Kenneth J. Dorner
*Assistant Examiner*—Harry C. Kim
*Attorney, Agent, or Firm*—Wenderoth, Lind & Ponack

[57] ABSTRACT

A connecting fitting for connecting a rail of a drawer to a rear wall of the drawer includes a supporting member to be fastened to the rear wall. The supporting member is structured to be mounted on an upper corner of the rear wall thereby clamping an upper horizontal flange and a side flange of the rear wall.

12 Claims, 2 Drawing Sheets

CONNECTING FITTING

BACKGROUND OF THE INVENTION

The invention relates to a connecting fitting for fastening a rear end of a rail of a drawer to a rear wall of the drawer by clamping. EP-B1-0 274 084 discloses a fitting of this kind.

The invention further relates to a connecting fitting assembly for fastening the rear end of a rail of a drawer to a rear wall of the drawer, such rear wall including an upper horizontal flange and two side flanges having a width equal to that of the upper horizontal flange.

In modern furniture, a drawer is provided with a front plate which is connected to side walls of the drawer by connecting fittings. In some cases, drawer rails are provided at positions above the drawer side walls and extend from the front plate to a rear wall of the drawer.

German Utility Model specification 8531302 discloses a drawer with drawer rails, the rails being held at their rear ends by snap-in connection fittings. This snap-in connection fitting makes it necessary that the distance between front and rear supports of the rail corresponds exactly to the length of the rail.

SUMMARY OF THE INVENTION

It is an object of the present invention to provide an improved connecting fitting for connecting the rear end of a rail to a rear wall of a drawer, wherein the connector fitting can be operated and employed without tools.

This object of the invention is achieved in that a slot is provided between an upper horizontal flange and each side flange of the rear wall. Rims are provided at free edges of such flanges. The fitting includes a supporting member to be fastened to the rear wall by clamping the upper horizontal flange and respective side flange of the rear wall. A securing element connects the rear end of the rail to the supporting member. The supporting member comprises a body describing a cylindrical segment with an arc of 270° and a cut-out in the form of a sector with an arc of 90°. The supporting member further has a bar with two webs extending in V-shape from the bar and in the direction of the body. The bar extending through the slot between the upper horizontal flange and a side flange of the rear wall. The two webs are positioned between the plane of said rear wall and the rims on the flanges of the rear wall.

BRIEF DESCRIPTION OF THE DRAWINGS

An embodiment of the invention is described in detail below with reference to the attached drawings, wherein.

DETAILED DESCRIPTION OF THE INVENTION

Figure 1:
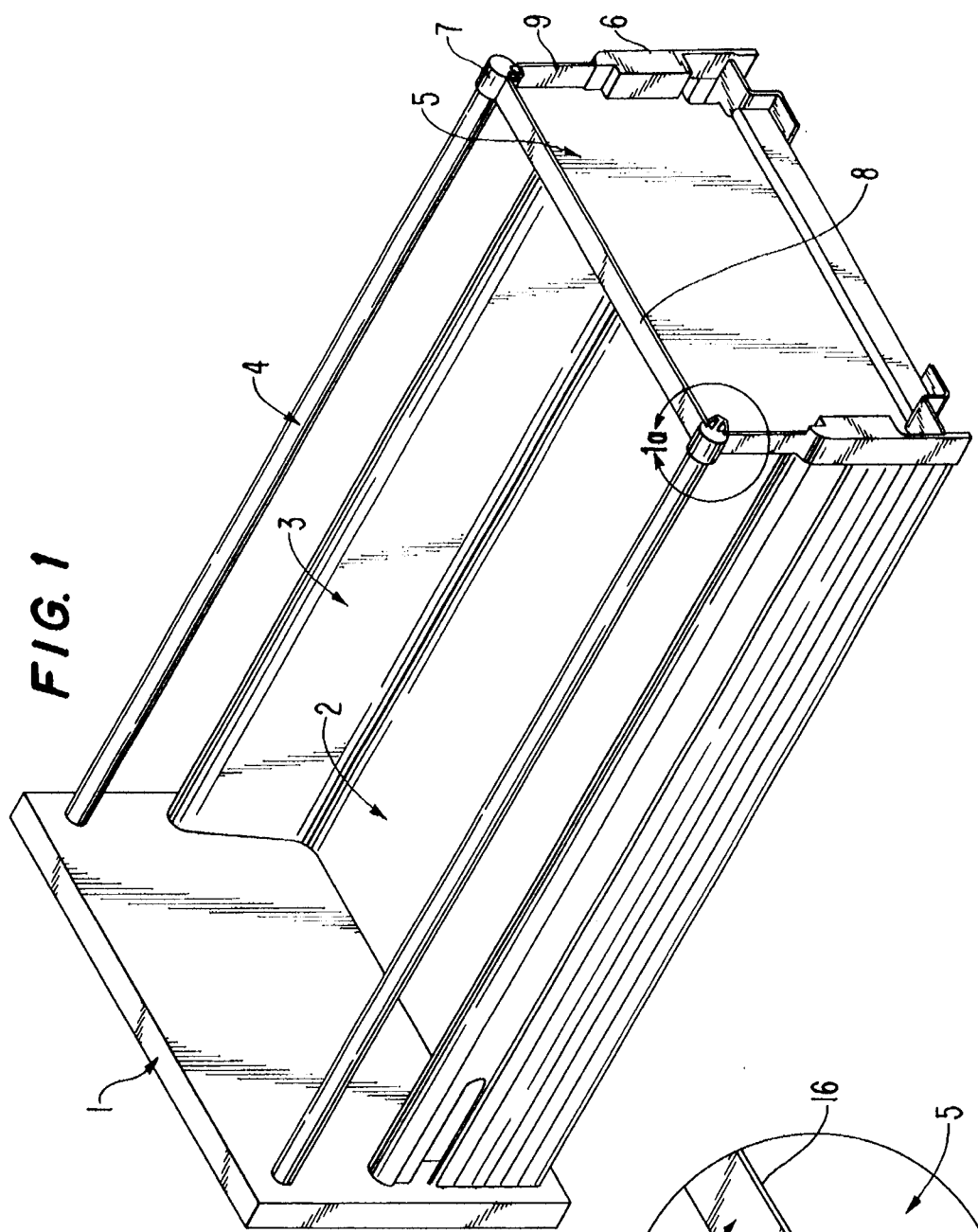
FIG. 1 is a perspective view of a drawer.
Figure 1A:
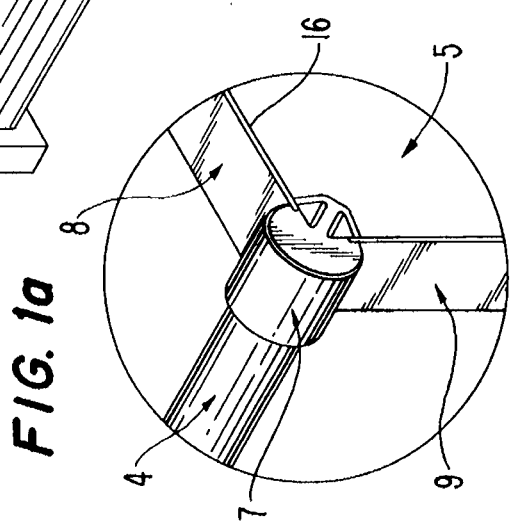
FIG. 1a is an enlarged view of a detail of FIG. 1.

A drawer includes two metallic drawer side walls 3, a front plate 1, a drawer bottom 2 and a rear wall 5. On each side of the drawer above the respective side wall 3 there is provided a rail 4. Each rail 4 is secured at a front end thereof to the front plate 1 and by means of a connecting fitting 7 to the rear wall 5. The rear wall 5 is connected to the side walls 3 by means of connectors 6.

The rear wall 5 is provided with an upper horizontal flange 8 extending to the rear and two side flanges 9 of equal width also extending to the rear. In each corner defined by the flange 8 and the respective flange 9 there is provided a slot 10. The connecting fittings 7 protrude into these slots 10.

Each connecting fitting 7 is provided with a supporting member 11 adapted to be fastened to the rear wall 5. Each supporting member 11 comprises a bar 12 with two webs 13, the two webs 13 forming a V. The connecting fitting 7 further comprises a body 14 describing a cylindrical segment with a circumferential arc of 270° and having a cut-out in the form of a sector with an arc of 90°.

Figure 2:
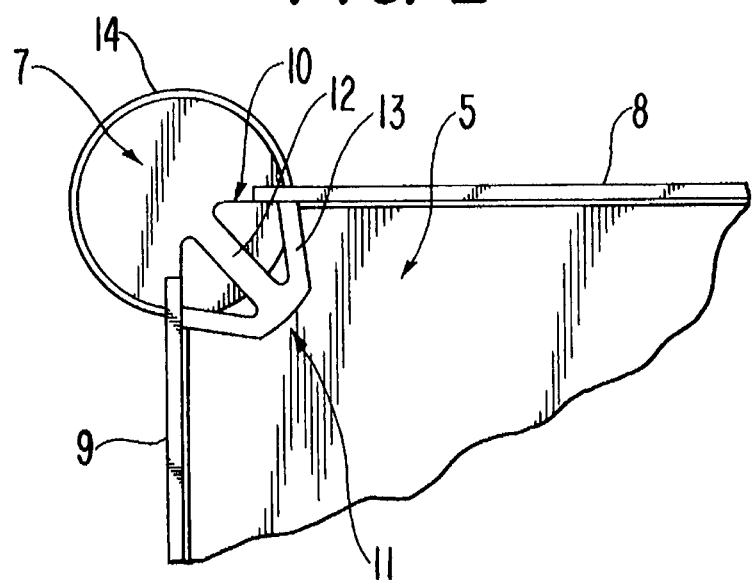
FIG. 2 is an end view of a connecting fitting.
Figure 3:
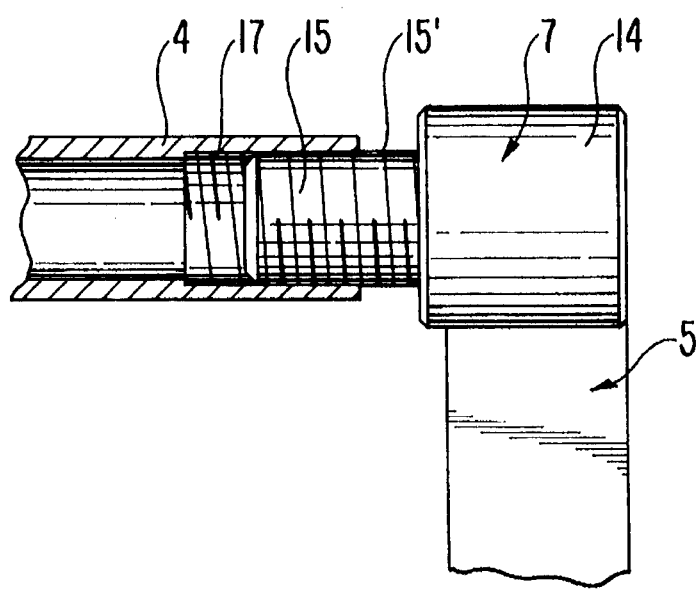
FIG. 3 is a side view of the connecting fitting, a rear wall of the drawer and a rail, the rail being shown in section.

The connecting fittings 7 are fastened to the corners of the rear wall 5 in such a way that the bars 12 extend through the slots 10 and the webs 13 abut inner first sides of the flanges 8 and 9. The body 14 is positioned on outer second sides of the flanges 8 and 9. The flange 8 is provided with a rim 16. The rim 16 extends downwardly. When the connecting fitting 7 is pushed on the corner defined by the flanges 8 and 9, a respective web 13 is held in a snap-in connection behind the rim 16. Advantageously, also the flanges 9 are provided with rims along their free edges. As shown particularly in FIG. 2, each web 13 extends toward a respective wall of body 14 defining the cut-out therein. Each web 13 and the respective body wall define therebetween a space into which fits and is clamped therebetween an end of a respective flange 8, 9.

The body 14 carries a cylindrical securing element 15 for the rail 4. The securing element 15 is provided with an outer thread 15'. The rail 4 is provided with an inner thread 17, so that the rail 4 can be screwed on the securing element 15.

I claim:

1. A connecting fitting for fastening a rear end of a rail of a drawer to a rear wall of the drawer, said connecting fitting comprising:

a securing element to be secured to the rear end of the rail; and a supporting member integral with said securing element and to be fastened to the rear wall by clamping, said supporting member comprising a body describing a cylindrical segment with an arc of 270° and having a cut-out in the form of a sector with an arc of 90°, a bar integral with said body at a position at an innermost portion of said cut-out therein, said bar extending from said body centrally through said cut-out, said bar having integral with an outer end thereof two webs defining a V-shape, each said web extending toward a respective wall of said body defining said cut-out therein, and each said web and said respective body wall defining therebetween a space.

2. A connecting fitting as claimed in claim 1, wherein said securing element comprises a cylindrical projection extending from said body.

3. A connecting fitting as claimed in claim 2, wherein said projection has exterior threads.

4. A connecting fitting as claimed in claim 2, wherein said cylindrical projection and said body are coaxial.

5. A connecting fitting as claimed in claim 1, wherein said body is closed circumferentially between walls thereof defining said cut-out.

6. An assembly of a rear wall of a drawer and a connecting fitting connected thereto for fastening rear end of a drawer rail thereto, wherein said rear wall has an upper horizontal flange and a side vertical flange having respective end edges that are spaced at a corner of said rear wall to define thereat a slot, and wherein said connecting fitting comprises:

a securing element to be secured to the rear end of the rail;

a supporting member integral with said securing element and to be fastened to said rear wall by clamping, said supporting member comprising a body describing a cylindrical segment with an arc of 270° and having a cut-out in the form of a sector with an arc of 90°, a bar integral with said body at a position at an innermost portion of said cut-out therein, said bar extending from said body centrally through said cut-out, said bar having integral with an outer end thereof two webs defining a V-shape, each said web extending toward a respective wall of said body defining said cut-out therein, and each said web and said respective body wall defining therebetween a space; and said connecting fitting being fastened to said rear wall by said bar extending inwardly through said slot and by each said flange extending into a respective said space and being clamped between a respective said web and body wall.

7. An assembly as claimed in claim 6, wherein said securing element comprises a cylindrical projection extending from said body.

8. An assembly as claimed in claim 7, wherein said projection has exterior threads.

9. An assembly as claimed in claim 7, wherein said cylindrical projection and said body are coaxial.

10. An assembly as claimed in claim 6, wherein said body is closed circumferentially between walls thereof defining said cut-out.

11. An assembly as claimed in claim 6, wherein a first said web abuts said upper horizontal flange, and a second said web abuts said side vertical flange.

12. An assembly as claimed in claim 6, wherein each said flange has extending therefrom a rim, and each said web fits between said rear wall and a respective said rim.

* * * * *